United States Patent [19]
Yamamoto et al.

[11] 3,898,089
[45] Aug. 5, 1975

[54] SILVER HALIDE PHOTOGRAPHIC MATERIAL CONTAINING A POLYHYDRIC ALCOHOL, A GLYOXAL AND A TRIAZINE

[75] Inventors: Nobuo Yamamoto; Ichiro Nakanishi; Yoshihide Hayakawa, all of Minami Ashigara, Japan

[73] Assignee: Fuji Photo Film Co., Ltd., Kanagawa, Japan

[22] Filed: Nov. 27, 1973

[21] Appl. No.: 419,317

[30] Foreign Application Priority Data
Nov. 28, 1972 Japan............................ 47-119106

[52] U.S. Cl. ...................... 96/111; 96/107; 96/109; 106/125; 260/117
[51] Int. Cl. .......................... G03c 1/30; G03c 1/34
[58] Field of Search ...... 96/111, 107, 109; 106/125; 260/117

[56] References Cited
UNITED STATES PATENTS

| | | | |
|---|---|---|---|
| 3,325,287 | 6/1967 | Yamamoto et al. | 96/111 |
| 3,505,071 | 4/1970 | Emmi | 96/111 |
| 3,650,759 | 3/1972 | Sonoda et al. | 96/109 |
| 3,717,467 | 2/1973 | Ohyama et al. | 96/111 |

*Primary Examiner*—Won H. Louie, Jr.
*Attorney, Agent, or Firm*—Sughrue, Rothwell, Mion, Zinn & Macpeak

[57] ABSTRACT

A silver halide photographic material comprising a support having thereon at least one silver halide photographic emulsion layer, the emulsion layer and/or an auxiliary layer containing glyoxal, a water-soluble salt of 2,4-dichloro-6-hydroxy-s-triazine and a polyhydric alcohol having at least two hydroxyl groups. The emulsion layer film of this photographic material has improved physical properties and ultraviolet ray transmittance.

13 Claims, No Drawings

SILVER HALIDE PHOTOGRAPHIC MATERIAL CONTAINING A POLYHYDRIC ALCOHOL, A GLYOXAL AND A TRIAZINE

BACKGROUND OF THE INVENTION

1. Field of the Invention

This invention relates to silver halide photographic materials, and more precisely, to those having an emulsion layer of improved physical properties and ultraviolet ray transmittance which are attained by the use of a new combination of hardening agent and a hardening auxiliary without adversely affecting the photographic properties of the photographic materials.

2. Description of the Prior Art

Photographic materials are, in general, composed of a silver halide photographic emulsion layer and other auxiliary layers such as an emulsion protecting layer, a filter layer, an intermediate layer, a subbing layer, an antihalation layer, a backing layer, etc. which are applied on a support such as a film base made from a hydrophobic high melecular weight substance such as a cellulose ester, polyethylene terephthalate, polystyrene or the like, or a paper, a waterproof paper, an artificial paper, a glass or the like. In many cases, these elements constituting the photographic materials usually contain gelatin and/or a gelatin derivative. However, layers containing the gelatin and/or the gelatin derivative (herein referred to as gelatin-containing layers for brevity) are poor in abrasion resistance, dimension stability and flexibility as well as water resistance in photographic treatment, and therefore, it is necessary to use a gelatin hardening agent as well as other various kinds of additives in the gelatin-containing layers, for the purpose of practically maintaining durable physical or mechanical strength in the elements constituting the photographic materials.

In particular, a lith-film to be used in photo-engraving is subjected to fairly severe conditions, and therefore requires particularly high quality physical properties such as dimension stability against moisture and heat, flexibility, resistance to damage, adhesion between the support and the gelatin-containing layer, etc. Accordingly, in the manufacture of such lith-films, the planning of the quality thereof is carried out by appropriately selectively employing a hardening agent and other additives so as to be able to obtain excellent physical properties as described above.

In addition, silver halide photographic materials, for example, lith-films to be used in photo-engraving, also require high quality photographic properties such as photographic contrast, half-tone quality, relative sensitivity, etc., similar to the physical properties as described above. Moreover, it is desirable that these photographic properties be stable and fluctuate to the least extent possible even though the photographic materials are stored under various conditions such as high temperature and high humidity or high temperature and low humidity. Accordingly, to improve the physical properties of gelatin-containing photographic layers of photographic materials, it is desirable to utilize those methods that can impart an effect to improve also the above described various photographic properties but never adversely affect the photographic properties.

Various methods using various kinds of additives in order to satisfy these requisites have heretofore been proposed. These conventional methods include, for example, a method where a vinyl polymer aqueous dispersion is added (as disclosed in Japanese Pat. Publn. No. 1718/64 and U.S. Pat. No. 3,142,568) and a method where a vinyl polymer aqueous dispersion is added together with formaldehyde and a halogen-substituted unsaturated aldehydeacid (as disclosed in Japanese Pat. Publn. No. 19951/70 and British Pat. No. 1,163,724). In the former method, however, although the dimension stability and flexibility of photographic emulsion coated layers are improved due to the substitution of a part of gelatin, which is a binder, by the emulsion-polymerized latex of acrylic acid or an acrylic acid derivative, the method sometimes is accompanied with unfavorable results in that the abrasion resistance of the surface of the film and the adhesion between the support and photographic emulsion coated layers are reduced. On the other hand, according to the latter method, although the dimension stability, flexibility and adhesion are improved, the surface hardness such as scratch hardness is still not sufficient and further, this method is accompanied by desensitization, somewhat degrading the photographic properties of the resulting photographic materials. Anyhow, the latter method also is not always satisfactory for practical use.

On the other hand, another important characteristic which the lith-film to be used in photo-engraving should possess is pertinent ultraviolet-ray transmittance. Lith-films are in many cases used as printing negatives such as line negatives, half-tone negatives, etc., in the manufacture of various kinds of printing plates. Accordingly, lith-films must possess the ability to be able to efficiently transmit or absorb light from a printing light source according to the difference in densities in the line part and the non-line part of a printing negative, in the preparation of various kinds of printing plates. In this case, when the transparent part (or negative image part) has the property of absorbing light in the range of wavelength corresponding to the color sensitivity of the light-sensitive photo-engraving material, the printing effect is lowered and the time for exposure is thereby prolonged with the result that the efficiency of the photo-engraving operation is greatly reduced.

In general, light-sensitive materials having a maximum sensitivity in the range of from the ultraviolet part to blue wavelength, such as colloidal dichromic acid, photo-sensitive diazo materials, etc. are used in the photo-engraving materials, and as the printing light source, for example, arc lamps, mercury-vapor lamps, xenon lamps, etc. which have a spectral distribution corresponding to the range of spectral sensitivity of the light-sensitive photo-engraving materials used are employed. Thus, appropriate kinds of light sources for photo-engraving are selected with respect to the spectral energy distribution and the strength of light, so that the printing operation can efficiently and economically be carried out.

However, when the transparent part of a lith-film to be used as a printing negative shows light absorbability in the range of the above described spectral distribution, the degree of effective utilization of light is reduced by the quantity of the light which is absorbed by the negative in the printing step of the printing plate, and after all, the attention paid to the selection of the light source as described above becomes meaningless in such a case. Various factors are believed to cause the unfavorable ultraviolet part absorbability by lith-films, and in particular, it is believed that the most important of them is the hardening agent added to a gelatin-containing layer constituting the lith-film causing this unfavorable phenomenon. More particularly, when the hardening agent itself or gelatin which has been hardened by the hardening agent shows light absorbability in the above described spectral distribution range, it becomes necessary to prolong the printing time in accordance with the decrease in quantity of light resulting from the absorption of the light by the gelatin-containing layer and the accompanying obstruction to the arrival of the light to the light-sensitive photo-engraving material. A plurality of negatives to be printed on a photo-engraving material are sometimes partly piled up to produce a composite image, and in this case, when the transparent part of the negative has light absorbability, some difference occurs in the quantity of transmitted light depending on the number of negatives piled with the result that printed mottles tend to occur. Accordingly, in lith-films to be used in photo-engraving, further attention as described below must be paid to the selection of hardening agents to be used for the purpose of improving the physical strength of the photographic layers of these films without degrading the photographic properties thereof. More precisely, almost all photo-engraving materials which are widely used in photo-engraving have a maximum sensitivity in the wavelength range of 300 to 360 nm, and therefore it is necessary to select appropriate hardening agents so that the hardening agent used or the hardened gelatin-containing layer does not lower the degree of effective utilization of light in this wavelength range, or in other words, so that a hardened gelatin-containing photographic layer having good light transmittance in this wavelength can be obtained.

For example, as is apparent from the fact that a gelatin-containing photographic layer which has been hardened by a known combination of formaldehyde and a halogen-substituted aldehyde-acid shows a relatively strong absorption spectrum in the ultraviolet wavelength range (300–310 nm), this gelatin-containing photographic layer hardened by this known combination is defective when utilized as negative photographic materials for photoengraving in that a long exposure time in the printing operation is required and effective utilization of light from the printing light source is decreased. As described above, although the use of various kinds of additives has heretofore been tried, no appropriate method has as yet been found to be able to effectively improve the physical properties of the gelatin-containing layers of silver halide photographic materials without injuring some of the photographic properties of these materials as well as the printing quality thereof to other photo-engraving materials. Thus, it has heretofore been difficult to obtain printing photographic materials having practically sufficient properties.

SUMMARY OF THE INVENTION

One of the objects of the present invention is to provide silver halide photographic materials in which gelatin-containing layers applied on a support have extremely good physical properties.

Another object of the present invention is to provide silver halide photographic materials in which the physical properties of the gelatin-containing layers applied on a support have been improved without degrading any of the photographic properties of the photographic emulsion layers.

Still another object of the present invention is to provide silver halide photographic materials in which the physical properties of the gelatin-containing layers applied on a support have been improved without degrading any of the photographic properties of the photographic emulsion layers and the printing quality thereof to other photo-engraving materials have also been improved.

The inventors have found, after repeated studies, that the above described objects can be attained by incorporating a combination of glyoxal, a water-soluble salt of 2,4-dichloro-6-hydroxy-s-triazine and a polyhydric alcohol having at least two hydroxyl groups, into a silver halide photographic material.

DETAILED DESCRIPTION OF THE INVENTION

In the present invention, the above described specific combination of glyoxal, the triazine compound and the polyhydric alcohol having at least two hydroxyl groups generally displays the effect thereof when incorporated in the silver halide photographic emulsion layers, but the combination can also be incorporated in other layers adjacent to the photographic emulsion layer, such as in a protective layer, an antihalation layer, an intermediate layer, etc., or can also simultaneously be incorporated in a backing layer of a support. In addition, these silver halide photographic layers, adjacent layers and backing layer can contain a vinyl polymer latex in various kinds of dispersing agents, for the purpose of improving the dimension stability of the gelatin-containing layers.

The glyoxal used in the present invention is a well known hardening agent, but when this is used alone and added to a photographic emulsion coated layer, although this serves to strongly suppress the swelling of the gelatin-containing photographic layer during photographic treatment, the effect thereof is insufficient to increase the surface hardness of the coated layer, and further this addition of glyoxal alone has the defect of causing the occurrence of fog in a photographic emulsion, which defect is extremely remarkable particularly when the photographic material containing the glyoxal is left under the conditions of high temperature and low humidity.

On the other hand, among known hardening agents 2,4-dichloro-6-hydroxy-s-triazine is a hardening agent which has excellent properties, in that the hardening speed thereof is high, in that the swelling of the hardened gelatin-containing layers during photographic treatment is strongly suppressed and in that the photographic properties of photographic materials are scarcely affected. However, when a large amount of this triazine is used alone in photographic materials for the purpose of improving the surface hardness of the coated layers, the triazine tends to cause a reduction in the sensitivity of the photographic materials when the materials are left under the conditions of high temperature and high humidity, which is practically defective.

As described above, when glyoxal and 2,4-dichloro-6-hydroxy-s-triazine are individually used in silver halide photographic materials, practically sufficient effects cannot always be attained. Whereas, when the glyoxal and 2,4-dichloro-6-hydroxy-s-triazine and a polyhydric alcohol having at least two hydroxyl groups are used in combination, according to the present invention, the physical properties of the gelatin-containing layers are extremely highly improved, and in particular, the surface hardness thereof is extremely remarkably improved. Further, no degradation of the photographic properties such as a reduction in sensitivity, occurrence of fog, etc. occurs at all. In addition, photographic materials for photo-engraving which have been hardened with this combination of the two kinds of hardening agents and the polyhydric alcohol according to the present invention have extremely good printing quality.

It has been known that, in various kinds of silver halide photographic materials, when vinyl polymers are incorporated in the photographic layers thereof, various kinds of photographic properties thereof are improved, and in particular, dimensional stability against variations in temperature and humidity is highly improved. In this connection, it has also been found that, in the present invention, when the specific combination of the two kinds of hardening agents and the polyhydric alcohol is employed together with a vinyl polymer, the physical properties of the photographic layers are extremely reinforced with the good dimensional stability thereof being maintained as such, and in particular, abrasion resistance and adhesion to the support are so greatly improved that they are durable to any severe treatment practically encountered. Such vinyl polymers which are suitable are, for example, the vinyl polymer latex or hydrosol as described, for example, in U.S. Pat. No. 3,142,568 and Japanese Pat. Publn. No. 5331/70.

The water-soluble salt of 2,4-dichloro-6-hydroxy-s-triazine used in the present invention has a structure in which the hydrogen atom of the 6-hydroxyl group thereof is substituted by a cation. The cation acts only as a counter ion broadly, and can be any and every ion. Representative examples of suitable ions are, for example, an alkali metal ion, such as a sodium, potassium or lithium ion, an alkaline earth metal ion such as a calcium, barium or strontium ion, an ammonium ion such as an ammonium, tetramethyl ammonium, tetraethyl ammonium or tetrabutyl ammonium ion.

Typical water-soluble salts of 2,4-dichloro-6-hydroxy-s-triazine are, for example, as follows:

Compound (a): Sodium salt of 2,4-dichloro-6-hydroxy-s-triazine

Compound (b): Potassium salt of 2,4-dichloro-6-hydroxy-s-triazine

Compound (c): Barium salt of 2,4-dichloro-6-hydroxy-s-triazine

Compound (d): Calcium salt of 2,4-dichloro-6-hydroxy-s-triazine

These compounds can be synthesized according to the method as described in U.S. Pat. No. 3,325,287, and are used in general in the form of an aqueous solution.

Secondly, the polyhydric alcohols which can be used in the present invention are water-soluble and contain from about 2 to 20, preferably 2 to 14, carbon atoms and from 2 to about 12, preferably 2 to about 6 hydroxy groups. Representative examples of these polyhydric alcohols are as follows: ethylene glycol, 1,2-propanediol, 1,3-propanediol, 1,3-butanediol, 2,3-butanediol, 1,4-butanediol, 2,2-dimethyl-1,3-propanediol, 2-methyl-2-propyl-1,3-propanediol, 1,5-pentanediol, 2-methyl-2,4-pentanediol, 2,2,4-trimethyl-1,3-pentanediol, 1,6-hexanediol, 1,7-heptanediol, 2,5-dimethyl-2,5-hexanediol, 2-ethyl-1,3-hexanediol, dipropylene glycol, 1,2-cyclopentanediol, 1,4-cyclohexanedimethanol, 1,2-cyclohexanediol, 1,4-cyclohexanediol, glycerin, trimethylolpropane, trimethylolethane, trimethylolhexane, 1,2,4-butanetriol, 1,2,6-hexanetriol, pentaerythritol, adonitol, sorbitol, mannitol, etc.

The amount of glyoxal added in the present invention can vary over a broad range. In general, sufficient results can be attained when the glyoxal is used in the range of about 0.01 to about 50 g, preferably 0.1 to 20 g, per 100 g of dried gelatin. The amount of the water-soluble 2,4-dichloro-6-hydroxy-s-triazine salt used in combination with the glyoxal is also not specifically limiting. In general, sufficient results can be attained when the salt is used in the range of about 0.05 to about 10 mol, preferably 0.1 to 5 moles or so, per 1 mol of glyoxal. The amount of polyhydric alcohol used in combination with the glyoxal and the water-soluble triazine salt in the present invention is not specifically limiting either. In general, sufficient results can be attained when the alcohol is used in the range of about 0.1 to about 10 mol, preferably 0.5 to 2.0 moles, per 1 mole of glyoxal. If the amount used is less than this range, improvement of surface hardness of gelatin-containing photographic layer is insufficient, and further, degradation of the photographic properties (such as an increase of the occurrence of fog under conditions of high temperature and low humidity) sometimes occurs. On the other hand, when a larger amount is added outside this range, adhesion to the surface layer of photographic material increases with the result that material tends to too easily adhere to other materials when contacted therewith.

The above described two kinds of hardening agents and the polyhydric alcohol used according to the present invention can be used in silver halide photographic emulsion layers or in other layers which do not substantially contain any silver halide. Among them, the respective hardening agents and polyhydric alcohol can be added altogether to one layer to be hardened in photographic elements, or otherwise can also be added separately to adjacent layers. When these two kinds of hardening agents and the polyhydric alcohol are altogether used in the same layer, the order for addition thereof is optional, and, for example, the water-soluble triazine salt, the glyoxal and the polyhydric alcohol can be added in this order to a silver halide photographic emulsion before coating, or alternatively, a glyoxal aqueous solution and the polyhydric alcohol are previously admixed and added to the emulsion and the triazine salt aqueous solution is thereafter added thereto, and then the emulsion thus containing these additives is applied on a support and dried.

The present invention can be applied to various kinds of silver halide photographic emulsions which are well known in the photographic art. These include orthomatically sensitized emulsions, panchromatically sensitized emulsions, infrared-sensitive emulsions, emulsions for recording non-visible rays such as X-rays, γ-rays, electron beams, etc. As a dispersion medium(s) for the photographic emulsion is(are) used gelatin and/or gelatin derivatives such as acylated gelatin as described in U.S. Pat. Nos. 2,523,753 and 2,691,582, and graft gelatin as described in U.S. Pat. Nos. 2,831,767 and 3,620,751, and a portion of or substantially all of them can be replaced by colloidal alubumin, cellulose derivatives such as carboxymethyl cellulose, hydroxyethyl cellulose, etc., or synthetic high molecular weight substances such as polyvinyl compounds such as polyvinyl alcohol, polyvinyl pyrrolidone, etc., and the thus replaced mixture can be used as the dispersion medium. Photographic emulsions are applied on various kinds of supports such as cellulose ester films, polyvinyl acetal films, polyethylene terephthalate films, polystyrene films and other similar films, as well as papers, polyethylene coated papers, artificial papers and the like. Silver halide photographic emulsions suitable for use in the present invention can be sensitized with a chemical sensitizer, for example, as described in U.S. Pat. Nos. 1,574,944; 2,399,083; 2,410,689; 2,487,850; 2,521,925; 2,540,085; 2,598,075; 2,642,361; 2,983,609; 3,189,458; 3,201,254; and 3,501,313, or a polyalkyleneoxide derivative for example, as described in U.S. Pat. Nos. 2,708,162; and 2,944,898, etc., which are well known in the photographic art, or can also be sensitized according to a method using a combination of these known sensitizers. The photographic emulsion layers can be stabilized by the addition of various kinds of anti-fogging agents and stabilizers, for example, as described in U.S. Pat. Nos. 2,131,038; 2,377,375; 2,394,198; 2,403,927; 2,691,588; 2,708,162; 2,728,663 – 7; and 3,163,536, etc. which are also well known in the photographic art, or can further contain various kinds of known photographic hardening agents as disclosed in U.S. Pat. Nos. 3,232,763; 3,232,764; 3,288,775, 3,635,718; 2,732,316; 3,017,280; 2,725,294; 2,725,295; 2,983,611; 3,103,437; 2,586,168; 3,543,292; 3,321,313; 3,186,848; 3,490,911; and 3,671,256. The photographic emulsions can contain photographic color forming couplers which react with the oxidation products of primary aromatic amino developing agents to form dyes and examples of which are described in U.S. Pat. Nos. 2,322,027; 2,474,293; 2,530,349; 2,600,788; 3,034,892; 3,062,653; 3,265,506; 3,516,831; 3,582,322, can contain dye developers for the color diffusion transfer process as described in U.S. Pat. Nos. 2,983,605; 3,076,820; 3,135,604; 3,297,441; 3,255,001, and can contain dyes for the silver dye beaching process as described in U.S. Pat. Nos. 3,210,190; 3,651,494.

In the photographic emulsion layers and adjacent layers, coating agents which are well known in the photographic art as disclosed in U.S. Pat. Nos. 2,831,766; 2,992,108; 3,068,101; 3,133,816, 3,415,649; 3,516,835; and 3,666,478, can be used, for example, natural surfactants such as saponin, non-ionic surfactants, anionic surfactants, cationic surfactants or amphoteric surfactants, and these agents can be used alone or as a combination of these agents. To the photographic emulsion layers and adjacent layers water-dispersible photographic vinyl polymers which are well known in this technical field, as so described above can be added. The surface layers of the silver halide photographic materials of the present invention can be treated with various kinds of antistatic agents for static charge prevention, as disclosed in U.S. Pat. Nos. 2,882,157; 3,201,251; 3,547,643; and 3,756,828, and further can be made coarse by the use of various kinds of matting agents such as titanium dioxide, zinc oxide silica, polymeric beads as described in U.S. Pat. Nos. 2,701,245; 2,992,101 and 3,353,958.

Now, the present invention will be explained in greater detail by reference to the following Examples. Unless otherwise indicated, all parts and percents are by weight.

EXAMPLE 1

To a photographic emulsion for a photo-engraving material which contains 110 g of gelatin and 105 g of silver bromoiodochloride per 1 kg of emulsion was(-were) added mucochloric acid which is a known hardening agent or glyoxal and/or the above described compound (a) which are the hardening agents of the present invention and 1,2-propandiol added in combination with these hardening agents. Each was added in the amount as shown in the following Table 1, and the resulting emulsion was uniformly applied on a polyethylene terephthalate support coated with a subbing agent and the coating dried to form a layer thereon having a dried thickness of 6 $\mu$. Thus, various kinds of specimens were prepared. After each specimen was left at room temperature (about 20°– 30°C) for 14 days, the film thickness thereof after being swelled in the following lithographic developer solution was measured with a device for measuring the degree of swelling as described in German OLS No. 2,135,197.

| | |
|---|---|
| p-Methylaminophenol | 1 g |
| Sodium Sulfite (anhydrous) | 75 g |
| Hydroquinone | 9 g |
| Sodium Carbonate (monohydrate) | 30 g |
| Potassium Bromide | 5 g |
| Water to make | 1 liter |

The degree of swelling of the film based on the dry film thickness was calculated therefrom by the following formula:

$$\text{Degree of Swelling} = \frac{\text{Swelled Film Thickness}}{\text{Dry Film Thickness}} \times 100$$

Separately from this experiment, each specimen was immersed in the above developer and a needle having a diamond of 0.1 mm radius at the top end thereof was pressed into contact with the surface of the specimen, and the needle was moved along the surface of the film parallel to the film at a speed of 5 mm/sec, while the load was continuously changed in the range of 0 to 100 g, whereby the load on the needle with which the surface of the tested film was scratched was measured. The results of these tests are shown in the following Table 1.

Table I

| Specimen No. | Compound | Amount Added (mol/kg) | Degree of Swelling (%) | Scratch Hardness (g) |
|---|---|---|---|---|
| 1 | None | 0 | 385 | 7 |
| 2 | Mucochloric Acid | $0.6 \times 10^{-2}$ | 218 | 45 |
| 3 | Mucochloric Acid | $1.2 \times 10^{-2}$ | 174 | 60 |
| 4 | Glyoxal | $0.6 \times 10^{-2}$ | 202 | 50 |
| 5 | Glyoxal | $1.2 \times 10^{-2}$ | 163 | 71 |
| 6 | Glyoxal and 1,2-Propanediol | $0.6 \times 10^{-2}$ $0.72 \times 10^{-2}$ | 190 | 53 |
| 7 | Glyoxal and 1,2-Propanediol | $0.6 \times 10^{-2}$ $1.44 \times 10^{-2}$ | 172 | 63 |
| 8 | Compound (a) | $0.6 \times 10^{-2}$ | 191 | 49 |
| 9 | Compound (a) | $1.2 \times 10^{-2}$ | 155 | 68 |
| 10 | Glyoxal and | $0.6 \times 10^{-2}$ | 157 | 71 |

Table I-Continued

| Specimen No. | Compound | Amount Added (mol/kg) | Degree of Swelling (%) | Scratch Hardness (g) |
|---|---|---|---|---|
| 11 | Compound (a) | $0.6 \times 10^{-2}$ | 145 | 85 |
|    | Glyoxal | $0.6 \times 10^{-2}$ | | |
|    | 1,2-Propanediol | $0.72 \times 10^{-2}$ | | |
|    | and Compound (a) | $0.6 \times 10^{-2}$ | | |

As is apparent from the results contained in Table 1, Specimen (11) prepared using the combination of the present invention employing two kinds of hardening agents and a polyhydric alcohol displays favorable results in that the swelling thereof is more strongly suppressed and in that the scratch hardness thereof is higher, as compared with other Specimens (2), (3), (4), (5), (8) and (9) prepared by using a single hardening agent and also the other Specimens (6), (7) and (10) prepared by using a different combination of hardening agent(s).

In the next experiment, each of the above prepared specimens was treated as follows:

A. preserved at room temperature for 3 days.

B. left at 50°C and 40% RH for 3 days for forced deterioration.

C. left at 50°C and 75% RH for 3 days for forced deterioration.

Afterwards, the thus treated specimens were exposed using a sensitometer with a light source of tungsten lamp of 32 luxes and 2660°K, through a step wedge, and then developed with a developer of the following composition for 4 minutes at 20°C and fixed and washed with water. Thereafter, the photographic properties of the thus treated specimens are observed. Developer Composition:

| | |
|---|---|
| N-Methyl-p-aminophenol Sulfate | 1.0 g |
| Sodium Sulfite (anhydrous) | 15.0 g |
| Hydroquinone | 4.0 g |
| Sodium Carbonate (monohydrate) | 26.3 g |
| Potassium Bromide | 0.6 g |
| Water to make | 1 liter |

The results obtained are shown in the following Table 2, from which the following conclusions can be drawn: Specimens (4) and (5) to which glyoxal only was added are sensitized in the test conditions of low humidity and high temperature, and further, fog increases under these conditions. With Specimens (6) and (7) where glyoxal and 1,2-propanediol were used together, although the degree of increase of fog is not as remarkable, the sensitivity thereof tends to fluctuate depending upon the variation of atmospheric humidity and temperature, that is, the photographic properties thereof are not stable. Specimens (8) and (9) which were hardened only with Compound (a) are somewhat desensitized in the elevated temperature tests under low humidity and high humidity, and further, the degree of increase of fog under high temperature and high humidity conditions is large. On the other hand, Specimen (11) hardened with the combination of the three compounds of the present invention displays excellent photographic properties in that fluctuations of sensitivity and fog are extremely slight.

Table 2

| Specimen No. | Relative Sensitivity | | | Fog | | |
|---|---|---|---|---|---|---|
| | Room Temperature for 3 Days | 40% RH, 50°C for 3 Days | 75% RH, 50°C for 3 Days | Room Temperature for 3 Days | 40% RH, 50°C for 3 Days | 75% RH, 50°C for 3 Days |
| 1 | 100 | 102 | 97 | 0.09 | 0.09 | 0.09 |
| 2 | 92 | 90 | 88 | 0.07 | 0.07 | 0.07 |
| 3 | 90 | 87 | 85 | 0.07 | 0.07 | 0.08 |
| 4 | 90 | 95 | 90 | 0.07 | 0.09 | 0.08 |
| 5 | 88 | 102 | 88 | 0.07 | 0.10 | 0.08 |
| 6 | 90 | 96 | 90 | 0.07 | 0.08 | 0.07 |
| 7 | 88 | 101 | 90 | 0.07 | 0.08 | 0.07 |
| 8 | 90 | 88 | 82 | 0.07 | 0.07 | 0.09 |
| 9 | 88 | 86 | 75 | 0.07 | 0.07 | 0.11 |
| 10 | 88 | 92 | 86 | 0.07 | 0.09 | 0.08 |
| 11 | 92 | 94 | 92 | 0.07 | 0.07 | 0.07 |

Next, non-exposed specimens (1), (2), (3) and (11) were developed in a commercially available developer for photoengraving materials, fixed and washed with water, and then the spectroabsorption spectrum in the ultraviolet portion of each of the thus treated specimens was measured. In the resulting data, the optical density at 360 nm was compared with one another. The results obtained are shown in the following Table 3, from which the following conclusions can be drawn:

Specimen (11) of the present invention which was hardened with the combination of the above three compounds has a more excellent light transmittance of light of 360 nm corresponding to the maximum sensitivity range of photo-engraving materials, as compared with other Specimens (2) and (3) where the above known hardening agents only were added, showing an optical density which is substantially the same as that of Specimen (1) where no hardening agent was added.

Table 3

| Specimen No. | Optical Density at 360 mm |
|---|---|
| 1 | 0.153 |
| 2 | 0.170 |
| 3 | 0.337 |
| 11 | 0.155 |

Next, a line-manuscript was printed on each specimen of the above described lith-films (1), (2), (3) and (11) and then these specimens were developed in a commercially available developer for photo-engraving materials, fixed and washed with water, whereby four sheets of printing negatives were prepared for each specimen. These four sheets of printing negatives thus obtained from one specimen were superposed to form a composite image, which was then printed on a commercially available diazo type presensitized printing plate and treated. In each specimen, the exposure time required for producing a line-image of the same density on the thus treated lithographic material was comparatively measured. In this experiment, a high-pressure mercury-vapor lamp and a carbon arc lamp were used as a light source, and diazo type presensitized printing plates, Planonegative Grain Coat manufactured by the Fuji Photo Film Co., Ltd., which is a negative-type material and Planosuperpositive Grain Coat manufactured by the Fuji Photo Film Co., Ltd., which is a positive-type material were used as lithographic sensitive materials. The results obtained are shown in the following Table 4, from which the following conclusions can be drawn: Specimen (11) prepared according to the method of the present invention and then subsequently subjected to the photographic treatment as described above has excellent ultraviolet-ray transmittance, and thus, is different from the other Specimens (2) and (3) which were hardened only with the known hardening agents and then subjected to the same photographic treatment. The present Specimen (11) requires the same exposure time as the control Specimen (1) where no hardening agent was added, for producing a line-image of the same density on the lithographic sensitive materials as tested above.

ball of 0.5 mm radius at the top end thereof was used in the scratch hardness test.

After being stored at room temperature, or left at 50°C and 40% RH for 3 days, or at 50°C and 75% RH for 3 days, the respective specimens were exposed with an NGS II-type sensitometer, and then were developed in the following developer for 7 minutes at 20°C, fixed and washed with water. Thus, the photographic properties of the respective specimens were tested and measured, and the results obtained are shown in the following Table 6. Developer Composition:

| | |
|---|---|
| N-Methyl-p-aminophenol Sulfate | 2.0 g |
| Sodium Sulfite (anhydrous) | 10.0 g |
| Hydroquinone | 5.0 g |
| Borax ($5H_2O$) | 1.5 g |
| Water to make | 1.0 liter |

Table 5

| Specimen No. | Compound | Amount Added (mol/kg emulsion) | Degree of Swelling (%) | Scratch Hardness (g) |
|---|---|---|---|---|
| 12 | None | 0 | 390 | 5 |
| 13 | Glyoxal | $1.0 \times 10^{-3}$ | 306 | 47 |
| 14 | Glyoxal and 2,3-Butanediol | $1.0 \times 10^{-3}$ $1.2 \times 10^{-3}$ | 297 | 48 |
| 15 | Compound (b) | $1.0 \times 10^{-3}$ | 291 | 50 |
| 16 | Glyoxal, 2,3-Butanediol, Compound (b) | $0.5 \times 10^{-3}$ $0.6 \times 10^{-3}$ $0.5 \times 10^{-3}$ | 280 | 60 |

Table 6

| Specimen No. | Relative Sensitivity | | | Fog | | |
|---|---|---|---|---|---|---|
| | Room Temperature | 40% RH, 50°C for 3 Days | 75% RH, 50°C for 3 Days | Room Temperature | 40% RH, 50°C for 3 Days | 75% RH, 50°C for 3 Days |
| 12 | 100 | 103 | 98 | 0.12 | 0.12 | 0.12 |
| 13 | 85 | 92 | 87 | 0.10 | 0.12 | 0.10 |
| 14 | 83 | 91 | 86 | 0.10 | 0.11 | 0.11 |
| 15 | 82 | 80 | 78 | 0.10 | 0.10 | 0.12 |
| 16 | 88 | 90 | 87 | 0.10 | 0.10 | 0.10 |

Table 4

| Specimen No. | High-pressure Mercury-vapor Lamp | | Carbon Arc Lamp | |
|---|---|---|---|---|
| | Nega-type | Posi-type | Nega-type | Posi-type |
| 1 | 50 sec. | 45 sec. | 100 sec. | 90 sec. |
| 2 | 55 | 50 | 110 | 100 |
| 3 | 80 | 70 | 160 | 145 |
| 11 | 50 | 45 | 100 | 90 |

EXAMPLE 2

To a photographic emulsion for high sensitive negative use which contains 120 g of gelatin and 65 g of silver bromoiodide per 1 kg of emulsion was(were) added glyoxal and/or Compound (b) and/or 2,3-butanediol, which relate to the present invention, each in an amount as shown in the following Table 5. Each of the emulsions thus containing these additive(s) was uniformly applied on a cellulose triacetate support coated with a subbing agent, and then dried to form a film of a dry thickness of 10 μ. Thus, various kinds of specimens for testing were prepared. Afterwards, each specimen was left at room temperature for 14 days and then the degree of swelling and scratch hardness thereof in the following developer were measured (Table 5). The degree of swelling and scratch hardness were measured using the same methods as described in Example 1, with the exception that a needle having a stainless steel From the results contained in Tables 5 and 6 above the following conclusions can be drawn: Specimen (16) prepared according to the present invention has extremely improved scratch hardness as compared with the other specimens where the respective hardening agent has been added individually (Table 5). In addition, Specimen (16) of the present invention has well balanced photographic properties in that fluctuations of relative sensitivity and fog are slight under the various conditions of different temperatures and humidities, as compared with the other Specimens (13), (15) and (14) which were hardened with a single hardening agent or with another combination of additives which is different from the combination of the present invention (Table 6).

EXAMPLE 3

Similar specimens were prepared in a manner similar to Example 1 with the exception that 35 g of gelatin in the emulsion used in Example 1 (in an amount of 110 g) were replaced by a polyethylacrylate latex (mol. wt.: about 200,000; means diameter: about 0.1 micron). The thus prepared specimens are numbered (1') – (11'), corresponding to the numbers employed for the specimens of Example 1. The degree of swelling, scratch hardness, ultraviolet-ray transmittance, photographic properties and printing time on lithographic sensitive materials of each of the resulting specimens were tested and measured in a manner similar to the Example 1. Among these tested properties, the results on the photographic properties, ultraviolet-ray transmittance and printing time on lithographic sensitive materials of Specimens (1') – (11') were the same as those of the corresponding Specimens (1) – (11) in Example 1. Whereas, the results on the degree of swelling and scratch hardness of the present specimens (1') – (11') are different from those of the Specimens (1) – (11) in Example 1 due to the effects of the addition of polymer latex (Table 7).

Table 7

| Specimen No. | Degree of Swelling (%) | Scratch Hardness (%) |
|---|---|---|
| 1' | 271 | 2 |
| 2' | 192 | 30 |
| 3' | 150 | 45 |
| 4' | 182 | 38 |
| 5' | 139 | 52 |
| 6' | 162 | 39 |
| 7' | 137 | 52 |
| 8' | 171 | 40 |
| 9' | 132 | 55 |
| 10' | 135 | 56 |
| 11' | 110 | 80 |

From the results contained in Table 7, the following conclusions can be drawn: In every specimen, the degree of swelling and scratch hardness were lowered as compared with the results of Example 1. Whereas, Specimen (11') hardened by the combination of two hardening agents and polyhydric alcohol according to the present invention displays favorable results in that the degree of swelling of the present Specimen (11') was extremely remarkably lowered while the scratch hardness thereof was lowered to a lesser extent, as compared with other Specimens (2'), (3'), (4'), (5'), (8') and (9') using a single hardening agent and also the other Specimens (6'), (7') and (10') using a different combination of hardening agent(s).

EXAMPLE 4

A photographic emulsion for a photo-engraving material which contains 75 g of gelatin, 110 g of silver bromoiodochloride and 40 g of polybutylmethacrylate latex (mol. wt: about 500,000; means diameter: about 0.08 micron) per 1 kg of emulsion was uniformly divided into five parts, to each of which was(were) added glyoxal or glyoxal and 1,2-cyclohexanediol, each in an amount as shown in the following Table 8. The resulting emulsion was applied on a polyethylene terephthalate support coated with a subbing agent and then was dried to form a film thereon having a dried thickness of 1 $\mu$. The gelatin aqueous solution to be applied as a protective layer contains Compound (a) or glyoxal and 1,2-cyclohexanediol, each in an amount as shown in the following Table 8.

Each of the specimens thus manufactured was left at room temperature for 14 days, and then the degree of swelling, scratch hardness and photographic properties thereof were tested and measured in a manner similar to Example 1 (Tables 8 and 9).

Table 8

| Specimen No. | Emulsion Layer Compound | Amount Added (mol/kg emulsion) | Protective Layer Compound | Amount Added (mol/kg gelatin) | Degree of Swelling (%) | Scratch Hardness (g) |
|---|---|---|---|---|---|---|
| 17 | None | 0 | None | 0 | 265 | 4 |
| 18 | Glyoxal | $6 \times 10^{-3}$ | None | 0 | 156 | 40 |
| 19 | Glyoxal and 1,2-Cyclohexanediol | $6 \times 10^{-3}$ $7 \times 10^{-3}$ | None | 0 | 155 | 44 |
| 20 | None | 0 | Compound (a) | $6 \times 10^{-3}$ | 149 | 48 |
| 21 | None | 0 | Glyoxal and 1,2-Cyclohexanediol | $6 \times 10^{-3}$ $7 \times 10^{-3}$ | 150 | 46 |
| 22 | Glyoxal and 1,2-Cyclohexanediol | $5 \times 10^{-3}$ $6 \times 10^{-3}$ | Compound (a) | $1 \times 10^{-3}$ | 115 | 64 |

Table 9

| | Relative Sensitivity | | | Fog | | |
|---|---|---|---|---|---|---|
| Specimen No. | Room Temperature | 40 RH, 50°C for 3 Days | 75% RH, 50°C for 3 Days | Room Temperature | 40% RH, 50°C for 3 Days | 75% RH, 50°C for 3 Days |
| 17 | 100 | 103 | 98 | 0.11 | 0.11 | 0.11 |
| 18 | 87 | 92 | 87 | 0.09 | 0.12 | 0.09 |
| 19 | 85 | 93 | 88 | 0.09 | 0.11 | 0.09 |
| 20 | 83 | 81 | 78 | 0.09 | 0.09 | 0.12 |
| 21 | 86 | 92 | 87 | 0.09 | 0.10 | 0.09 |
| 22 | 89 | 90 | 89 | 0.09 | 0.09 | 0.09 |

From the results set forth in Tables 8 and 9 the following conclusions can be drawn: Specimen (22) of the present invention which was prepared by adding the two hardening agents separately to the emulsion layer and the adjacent protective layer and which was hardened with the combination of the three compounds of the present invention displays favorable results in that the physical properties of the photographic layer thereof were markedly improved and that the photographic properties thereof also were good, that is, the occurrence of fog is slight and fluctuations of sensitivity due to variations of ambient temperature and humidity also is slight, as compared with the other Specimens (18) and (20) where a single hardening agent was used as well as the other Specimens (19) and (21) which were hardened with a combination of glyoxal and a polyhydric alcohol only.

While the invention has been described in detail and with reference to specific embodiments thereof, it will be apparent to one skilled in the art that various changes and modifications can be made therein without departing from the spirit and scope thereof.

What is claimed is:

1. A silver halide photographic material comprising a support and at least one silver halide photographic emulsion layer, said emulsion layer and/or an auxiliary layer of said photographic material containing 0.01 to 50 g per 100 g of dried gelatin of glyoxal, 0.05 to 10 mol per 1 mol of glyoxal of a water-soluble salt of 2,4-dichloro-6-hydroxy-s-triazine and 0.1 to 10 mol per 1 mol of glyoxal of a water-soluble, aliphatic, saturated polyhydric alcohol containing 2 to 20 carbon atoms and having 2 to 20 hydroxyl groups, said emulsion layer and/or auxiliary layer being a gelatin-containing layer.

2. The silver halide photograpic material as claimed in claim 1, wherein said glyoxal, said 2,4-dichloro-6-hydroxy-s-triazine salt and said polyhydric alcohol are in one or more silver halide photographic emulsion layers and/or at least one adjacent layer or a backing layer of said support.

3. The silver halide photographic material as claimed in claim 2, wherein said adjacent layer is a protective layer, an antihalation layer, or an intermediate layer.

4. The silver halide photographic material as claimed in claim 3, wherein said silver halide photographic emulsion layers, said adjacent layers thereof and/or said backing layer contain a dispersion of a vinyl polymer latex.

5. The silver halide photographic material as claimed in claim 1, wherein the hydrogen atom of the 6-hydroxyl group of said triazine is replaced by an alkali metal cation, an alkaline earth metal cation, or an ammonium cation.

6. The silver halide photographic material as claimed in claim 5, wherein said alkali metal cation is a sodium ion, a potassium ion or a lithium ion, said alkaline earth metal cation is a calcium ion, a barium ion or a strontium ion and said ammonium cation is an ammonium ion, a tetramethylammonium ion, a tetraethylammonium ion or a tetrabutyl ammonium ion.

7. The silver halide photographic material as claimed in claim 6, wherein said triazine salt is sodium 2,4-dichloro-6-hydroxy-s-triazine, potassium 2,4-dichloro-6-hydroxy-s-triazine, barium 2,4-dichloro-6-hydroxy-s-triazine or calcium 2,4-dichloro-6-hydroxy-s-triazine.

8. The silver halide photographic material as claimed in claim 1, wherein said polyhydric alcohol is ethylene glycol, 1,2-propanediol, 1,3-propanediol, 1,3-butanediol, 2,3-butanediol, 1,4-butanediol, 2,2-dimethyl-1,3-propanediol, 2-methyl-2-propyl-1,3-propanediol, 1,5-pentanediol, 2-methyl-2,4-pentanediol, 2,2,4-trimethyl-1,3-pentanediol, 1,6-hexanediol, 1,7-heptanediol, 2,5-dimethyl-2,5-hexanediol, 2-ethyl-1,3-hexanediol dipropyleneglycol, 1,2-cyclopentanediol, 1,4-cyclohexanedimethanol, 1,2-cyclohexanediol, 1,4-cyclohexanediol, glycerin, trimethylolpropane, trimethylolethane, trimethylolhexane, 1,2,4-butanetriol, 1,2,6-hexanetriol, pentaerythritol, adonitol, sorbitol, or mannitol.

9. The silver halide photographic material as claimed in claim 1, wherein said glyoxal is present at a level of about 0.1 to 20 g per 100 g of gelatin on a dry basis.

10. The silver halide photographic material as claimed in claim 1, wherein said triazine salt is present at a level of about 0.1 to 5 moles per mole of said glyoxal.

11. The silver halide photographic material as claimed in claim 1, wherein said polyhydric alcohol is present at a level of about 0.5 to 2.0 moles per mole of said glyoxal.

12. The silver halide photographic material as claimed in claim 1, wherein said glyoxal, said triazine salt and said polyhydric alcohol are present in the same layer of said photographic material.

13. The silver halide photographic material as claimed in claim 1, wherein said glyoxal, said triazine salt and said polyhydric alcohol are present in different layers of said photographic material.

* * * * *